April 11, 1950     A. P. MONTGOMERY     2,503,835
SIGNAL MAINTAINING CIRCUIT
Filed Sept. 1, 1944
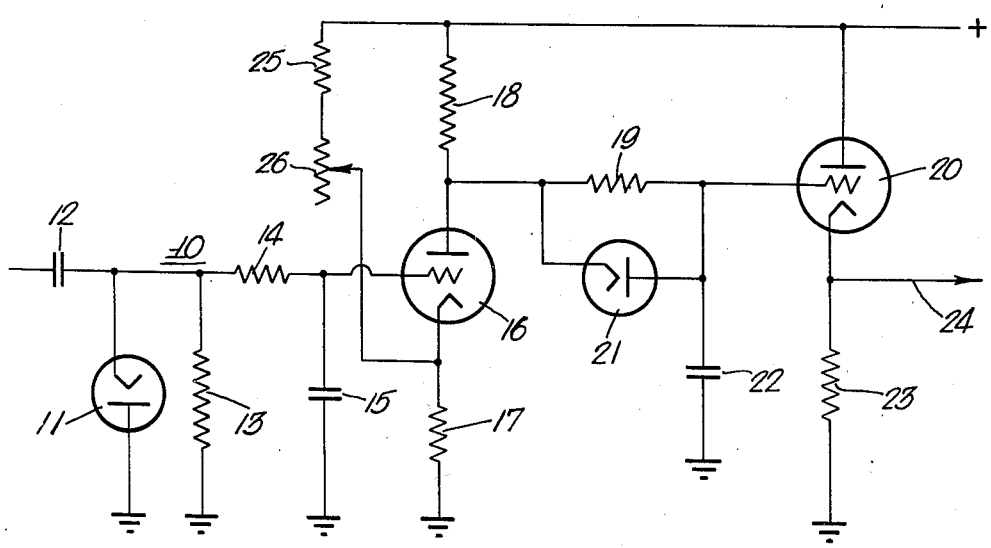
Inventor:
Andrew P. Montgomery
by his Attorneys
Howson & Howson Patented Apr. 11, 1950

2,503,835

UNITED STATES PATENT OFFICE 2,503,835

SIGNAL MAINTAINING CIRCUIT

Andrew P. Montgomery, Narberth, Pa., assignor, by mesne assignments, to Philco Corporation, Philadelphia, Pa., a corporation of Pennsylvania Application September 1, 1944, Serial No. 552,274

4 Claims. (Cl. 250—27)

This invention relates to a novel circuit arrangement for maintaining an output signal in response to an input signal which may be of sporadic character, and which includes a D. C. component that is to be preserved.

While the invention may be utilized in any instance where it may find useful application, it is particularly applicable to radio detecting and ranging (radar) systems of the type in which a D. C. control voltage is produced at the receiver in response to received echo signals. For example, the invention is applicable to the system disclosed and claimed in my copending application, Serial No. 552,275 filed September 1, 1944, now United States Patent No. 2,445,233, issued July 13, 1948, in which a D. C. control voltage is utilized to control a circuit which produces an intermittent audible signal whose frequency of recurrence varies according to the range or distance of a signal-reflecting object.

In a system of the type above mentioned, it is desirable to maintain the response to the received signals over short periods when the signal may be weak or absent due to fading or to rotation of the antenna. Such a system may be utilized, for example, as a warning system on an aircraft to indicate the presence and range of other aircraft approaching from a particular direction. In such a system, it is desirable to maintain the warning and range indication for short periods when the amplitude of the received signal may drop below the minimum required value due to fading or to rotation of the directional antenna. The circuit of the present invention is adapted to serve this purpose.

The principal object of the invention, therefore, is to maintain an output signal under the conditions above mentioned.

A more specific object of the invention is to provide a novel circuit embodying delay means for preserving an output signal, and including means for increasing the time constant of the delay means in response to decrease of amplitude of the input signal.

The invention may be clearly understood by reference to the accompanying drawing in which the single figure is a schematic illustration of one form of the novel circuit.

Since the invention is particularly applicable to a radar system, as above mentioned, it will be described with general reference thereto. As is well known, the conventional radar system comprises a transmitter which is adapted to generate an interrupted high frequency wave so as to produce successive signals which are transmitted by a scanning antenna. Associated with the transmitter is a receiver which is adapted to receive the signals when they are reflected back from an object within the operating range. The receiver converts the received signals into time-spaced pulse signals. In a system of the particular type above mentioned, which is adapted to produce an audible indication of the range or distance of the signal-reflecting object, the time-spaced pulse signals are converted into a D. C. control voltage whose magnitude varies according to the distance of the reflecting object.

Referring to the drawing, there is shown a detector designated generally by reference character 10 which is adapted to receive the pulse signals above mentioned and to convert them into a D. C. control voltage. The detector comprises a diode 11 to which the pulse signals are supplied by way of coupling condenser 12. Associated with the diode is a load-impedance 13 and a resistance-capacitance combination 14—15. The time constant of the R.-C. combination is considerably longer than the interval between successive pulse signals and, therefore, the output of the detector is substantially a D. C. voltage whose amplitude varies according to the amplitude of the received signals.

The D. C. voltage is applied to the control grid of a D. C. amplifier tube 16 having a cathode resistor 17 and a plate load resistor 18. Resistors 25 and 26 are connected as shown to bleed a current through resistor 17, which current is large compared to the current of tube 16. In this way, the cathode voltage of tube 16 is maintained more constant, and the degenerative effect of the cathode resistor is reduced. The variable resistor 26 is also used to set the output voltage at 24 to the desired value in the absence of signals.

Connected to the anode of tube 16 is a resistor 19, the opposite end of which is connected to the control grid of a cathode follower tube 20. A diode 21 is connected in shunt relation to the resistor 19. A condenser 22 is connected between ground and the grid of tube 20. The latter is provided with a cathode load resistor 23 from which the output is derived by means of conductor 24.

The values of resistors 18 and 19 and condenser 22 are such as to provide different time-constants according to the increase or decrease of amplitude of the incoming signal. The diode 21 serves to control the time-constant in a manner which will be presently described. The value of resistor 19 is much greater than that of resistor 18 so that the time constant is greater when the diode 21 is non-conducting than it is when the diode is conducting.

Considering the operation of the circuit, the D. C. voltage applied to the grid of tube 16 is amplified and reversed in polarity by the D. C. amplifier tube. When the incoming signal is increasing, the plate current of tube 16 increases and the plate voltage of the tube decreases. Consequently the voltage applied to the cathode of diode 21 decreases causing the diode to conduct, thereby effectively short-circuiting the resistor 19. As a result, the time constant of the circuit is determined by the capacitance of condenser 22 and the parallel resistance of resistor 18 and the plate resistance of tube 16. Accordingly, the time constant is relatively small.

When the incoming signal decreases, the plate current of tube 16 decreases and the plate voltage rises thereby raising the voltage on the cathode of diode 21 and causing it to become non-conductive. At this time, the time constant is greatly increased due to the inclusion of the relatively high resistor 19. Consequently the delay time is much greater when the incoming signal is decreasing than it is when the signal is increasing.

The values of the circuit elements are so chosen that the increased delay time in the presence of a diminishing signal is sufficient to maintain the output during short periods when the signal may be weak or absent due to fading or to rotation of the antenna as above mentioned. Thus the circuit responds to the signal strength and varies its delay time accordingly so as to maintain the output. The delay time should be long enough to cover all periods when the signal is absent due to the above mentioned causes, but it should not be long enough to give a false indication for too great a period after the signal-reflecting object has passed out of the operating range.

In order to prevent loading of the delay circuit with shortening of delay time, the cathode follower tube 20 is used to derive the output. The use of this tube also affords a low impedance source of control voltage for the circuit to be controlled.

The D. C. output may be utilized to control any suitable circuit, for example, as mentioned above, it may be employed to control the circuit in my above mentioned co-pending application.

In a particular embodiment of the invention, the various circuit elements had the following values:

Condenser 12—.01 microfarad
    Resistor 13—1 megohm
    Resistor 14—1 megohm
    Condenser 15—.25 microfarad
    Resistor 17—4700 ohms
    Resistor 18—220,000 ohms
    Resistor 19—2.2 megohms
    Condenser 22—2 microfarads
    Resistor 23—100,000 ohms
    Resistor 25—47,000 ohms
    Resistor 26—50,000 ohms It will be understood, of course, that the invention is not limited to the details of the circuit shown nor to the specific values above given since it will be apparent to those skilled in the art that the invention is capable of modification without departing from the principles thereof.

I claim:

1. In a system for maintaining an output signal in response to an input signal which may be of sporadic character and which includes a D. C. component that is to be preserved, a D. C. amplifier arranged to receive and amplify said component, an output circuit for said amplifier, delay means associated with said output circuit so as to prolong the output of said amplifier, means for increasing the time constant of said delay means in response to decrease of amplitude of the input signal, whereby to maintain an output signal from said amplifier including said D. C. component during short periods when the input signal is absent, and a cathode follower tube connected to said output circuit.

2. In a system for maintaining an output signal in response to an input signal which may be of sporadic character and which includes a D. C. component that is to be preserved, a D. C. amplifier arranged to receive and amplify said component, said amplifier including an electron tube having at least triode elements, a resistor connected to the anode of said tube and included in the space current circuit thereof, an output circuit for said tube connected to said anode, a second resistor of much greater value than said first resistor serially connected in said output circuit, a capacitor shunted across said output circuit at the output end of said second resistor, said resistors and said capacitor in combination constituting a time delay control means for the output of said amplifier tube, and a diode connected in parallel relation with said second resistor to vary the time constant of said control means, said diode being rendered conductive when the input signal increases and non-conductive when the input signal decreases.

3. In a system for maintaining an output signal in response to an input signal which may be of sporadic character and which includes a D. C. component that is to be preserved, a D. C. amplifier arranged to receive and amplify said component, said amplifier including an electron tube having at least triode elements, a resistor connected to the anode of said tube and included in the space current circuit thereof, an output circuit for said tube connected to said anode, a second resistor of much greater value than said first resistor serially connected in said output circuit, a capacitor shunted across said output circuit at the output end of said second resistor, said resistors and said capacitor in combination constituting a time delay control means for the output of said amplifier tube, a diode connected in parallel relation with said second resistor to vary the time constant of said control means, said diode being rendered conductive when the input signal increases and non-conductive when the input signal decreases, and a cathode follower tube connected to said output circuit.

4. In a system for producing a D. C. control voltage in response to pulse signals, and for maintaining such voltage despite decreased amplitude or brief absence of said signals, a detector adapted to produce a D. C. voltage in response to input pulses, a D. C. amplifier connected to said detector, delay means associated with said amplifier so as to prolong the D. C. output thereof, and means for increasing the time constant of said delay means in response to decrease of amplitude of said input pulses.

ANDREW P. MONTGOMERY.

REFERENCES CITED

The following references are of record in the file of this patent:

UNITED STATES PATENTS

| Number | Name | Date |
| --- | --- | --- |
| 1,991,430 | Turner, Jr. | Feb. 19, 1935 |
| 2,003,992 | Cockrell | June 4, 1935 |
| 2,070,900 | Harris | Feb. 16, 1937 |
| 2,093,095 | Peterson | Sept. 14, 1937 |
| 2,208,349 | Ulbricht | July 16, 1940 |
| 2,222,172 | Dimmick | Nov. 19, 1940 |
| 2,227,906 | Kellogg | Jan. 7, 1941 |
| 2,266,516 | Russell | Dec. 16, 1941 |
| 2,405,843 | Moe | Aug. 13, 1946 |